US012562776B2

(12) United States Patent
Manolakos et al.

(10) Patent No.: US 12,562,776 B2
(45) Date of Patent: Feb. 24, 2026

(54) FREQUENCY HOPPING COORDINATION AND CONFIGURATION FOR SIDELINK COMMUNICATION

(71) Applicant: QUALCOMM Incorporated, San Diego, CA (US)

(72) Inventors: Alexandros Manolakos, Escondido, CA (US); Wei Yang, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/249,084

(22) PCT Filed: Dec. 9, 2021

(86) PCT No.: PCT/US2021/072817
§ 371 (c)(1),
(2) Date: Apr. 14, 2023

(87) PCT Pub. No.: WO2022/133401
PCT Pub. Date: Jun. 23, 2022

(65) Prior Publication Data
US 2023/0396286 A1     Dec. 7, 2023

(30) Foreign Application Priority Data

Dec. 16, 2020     (GR) ............................... 20200100733

(51) Int. Cl.
*H04W 4/00*       (2018.01)
*H04B 1/713*      (2011.01)
*H04L 5/00*       (2006.01)

(52) U.S. Cl.
CPC ........... *H04B 1/713* (2013.01); *H04L 5/0012* (2013.01); *H04L 5/0051* (2013.01); *H04L 5/0094* (2013.01)

(58) Field of Classification Search
CPC ...................................................... H04B 1/713
See application file for complete search history.

(56) References Cited

U.S. PATENT DOCUMENTS

2016/0135240 A1*   5/2016   Yoon ..................... H04W 8/005
                                                             370/329
2018/0167974 A1*   6/2018   Li ......................... H04L 5/0001
                            (Continued)

FOREIGN PATENT DOCUMENTS

WO        2020033089 A1     2/2020

OTHER PUBLICATIONS

International Search Report and Written Opinion—PCT/US2021/072817—ISA/EPO—Mar. 18, 2022.
(Continued)

*Primary Examiner* — Elisabeth Benoit Magloire
(74) *Attorney, Agent, or Firm* — Harrity & Harrity, LLP

(57) ABSTRACT

Various aspects of the present disclosure generally relate to wireless communication. In some aspects, a first user equipment (UE) may receive, from abase station, a set of sidelink frequency hopping parameters. The first UE may transmit, to a second UE via a sidelink interface, a frequency hopping configuration for sidelink reference signaling by the second UE, wherein the frequency hopping configuration is based at least in part on the set of sidelink frequency hopping parameters. Numerous other aspects are provided.

30 Claims, 12 Drawing Sheets

(56)  References Cited

U.S. PATENT DOCUMENTS

| | | | | |
|---|---|---|---|---|
| 2020/0029318 A1* | 1/2020 | Guo | ....................... | H04W 76/11 |
| 2021/0022131 A1* | 1/2021 | Liu | ....................... | H04W 72/23 |
| 2021/0051614 A1* | 2/2021 | Gulati | ............... | H04W 56/0015 |
| 2021/0105787 A1* | 4/2021 | Park | .................... | H04W 72/542 |
| 2021/0136732 A1* | 5/2021 | Fakoorian | ............. | H04W 28/26 |
| 2021/0144659 A1* | 5/2021 | Wu | ................... | H04L 27/26025 |
| 2021/0195649 A1* | 6/2021 | Xue | ....................... | H04W 72/20 |

OTHER PUBLICATIONS

Spreadtrum Communications: "Discussion on NR Sidelink Mode 1 Resource Allocation", 3GPP TSG RAN WG1 #97, R1-1906363 Discussion on NR Sidelink Mode 1 Resource Allocation Final, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 13, 2019, XP051727813, 8 Pages, Section 2.1, par. above "Proposal 6" incl. "Proposal 6 [ . . . ]",Section 2.2, par. 1, p. 1-p. 2.

* cited by examiner

400

710 Receive, from a base station, a set of sidelink frequency hopping parameters 720 Transmit, to a second UE via a sidelink interface, a frequency hopping configuration for sidelink reference signaling by the second UE, wherein the frequency hopping configuration is based at least in part on the set of sidelink frequency hopping parameters

700

810 — Receive, from a second UE via a sidelink interface, a frequency hopping configuration for sidelink reference signaling, wherein the frequency hopping configuration is based at least in part on a set of sidelink frequency hopping parameters 820 — Transmit a reference signal using the frequency hopping configuration

800

910 — Transmit, to a first user equipment (UE), a set of sidelink frequency hopping parameters for reference signaling by one or more second UEs of a sidelink network 920 — Receive reference signal reporting based at least in part on the set of sidelink frequency hopping parameters

900

1100

Reception Component 1102

Determination Component 1108

Transmission Component 1104

1106

FREQUENCY HOPPING COORDINATION AND CONFIGURATION FOR SIDELINK COMMUNICATION

CROSS-REFERENCE TO RELATED APPLICATIONS

This Patent Application is a 371 national stage of PCT Application No. PCT/US2021/072817 filed on Dec. 9, 2021, entitled "FREQUENCY HOPPING COORDINATION AND CONFIGURATION FOR SIDELINK COMMUNI-CATION," which claims priority to Greek patent application No. 20200100733, filed on Dec. 16, 2020, entitled "FRE-QUENCY HOPPING COORDINATION AND CONFIGU-RATION FOR SIDELINK COMMUNICATION," which are hereby expressly incorporated by reference herein.

FIELD OF THE DISCLOSURE

Aspects of the present disclosure generally relate to wireless communication and to techniques and apparatuses for frequency hopping coordination and configuration for sidelink communication.

BACKGROUND

Wireless communication systems are widely deployed to provide various telecommunication services such as tele-phony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier fre-quency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile stan-dard promulgated by the Third Generation Partnership Proj-ect (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promul-gated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broad-band access continues to increase, further improvements in LTE, NR, and other radio access technologies remain useful.

SUMMARY

Some aspects described herein provide a method of wireless communication performed by a first user equipment (UE). The method may include receiving, from a base station, a set of sidelink frequency hopping parameters. The method may include transmitting, to a second UE via a sidelink interface, a frequency hopping configuration for sidelink reference signaling by the second UE, wherein the frequency hopping configuration is based at least in part on the set of sidelink frequency hopping parameters.

Some aspects described herein provide a method of wireless communication performed by a first UE. The method may include receiving, from a second UE via a sidelink interface, a frequency hopping configuration for sidelink reference signaling, wherein the frequency hopping configuration is based at least in part on a set of sidelink frequency hopping parameters. The method may include transmitting a reference signal using the frequency hopping configuration.

Some aspects described herein provide a method of wireless communication performed by a base station. The method may include transmitting, to a first UE, a set of sidelink frequency hopping parameters for reference signal-ing by one or more second UEs of a sidelink network. The method may include receiving reference signal reporting based at least in part on the set of sidelink frequency hopping parameters.

Some aspects described herein provide an apparatus for wireless communication at a first UE. The apparatus may include a memory. The apparatus may include one or more processors coupled to the memory. The one or more pro-cessors may be configured to receive, from a base station, a set of sidelink frequency hopping parameters. The one or more processors may be configured to transmit, to a second UE via a sidelink interface, a frequency hopping configu-ration for sidelink reference signaling by the second UE, where the frequency hopping configuration is based at least in part on the set of sidelink frequency hopping parameters.

Some aspects described herein provide an apparatus for wireless communication at a first UE. The apparatus may include a memory and one or more processors coupled to the memory. The one or more processors may be configured to receive, from a second UE via a sidelink interface, a frequency hopping configuration for sidelink reference sig-naling, where the frequency hopping configuration is based at least in part on a set of sidelink frequency hopping parameters. The one or more processors may be configured to transmit a reference signal using the frequency hopping configuration.

Some aspects described herein provide an apparatus for wireless communication at a base station. The apparatus may include a memory and one or more processors coupled to the memory. The memory and the one or more processors may be configured to transmit, to a first UE, a set of sidelink frequency hopping parameters for reference signaling by one or more second UEs of a sidelink network. The memory and the one or more processors may be configured to receive reference signal reporting based at least in part on the set of sidelink frequency hopping parameters.

Some aspects described herein provide a non-transitory computer-readable medium that stores a set of instructions for wireless communication. The set of instructions may include one or more instructions that, when executed by one or more processors of a first UE, cause the first UE to receive, from a base station, a set of sidelink frequency hopping parameters; and transmit, to a second UE via a sidelink interface, a frequency hopping configuration for sidelink reference signaling by the second UE, where the frequency hopping configuration is based at least in part on the set of sidelink frequency hopping parameters.

Some aspects described herein provide a non-transitory computer-readable medium that stores a set of instructions for wireless communication. The set of instructions may include one or more instructions that, when executed by one or more processors of a first UE, cause the first UE to receive, from a second UE via a sidelink interface, a frequency hopping configuration for sidelink reference signaling, where the frequency hopping configuration is based at least in part on a set of sidelink frequency hopping parameters; and transmit a reference signal using the frequency hopping configuration.

Some aspects described herein provide a non-transitory computer-readable medium that stores a set of instructions for wireless communication. The set of instructions may include one or more instructions that, when executed by one or more processors of a base station, cause the base station to transmit, to a first UE, a set of sidelink frequency hopping parameters for reference signaling by one or more second UEs of a sidelink network; and receive reference signal reporting based at least in part on the set of sidelink frequency hopping parameters.

Some aspects described herein provide an apparatus for wireless communication. The apparatus may include means for receiving, from a base station, a set of sidelink frequency hopping parameters. The apparatus may include means for transmitting, to a UE via a sidelink interface, a frequency hopping configuration for sidelink reference signaling by the UE, wherein the frequency hopping configuration is based at least in part on the set of sidelink frequency hopping parameters.

Some aspects described herein provide an apparatus for wireless communication. The apparatus may include means for receiving, from a UE via a sidelink interface, a frequency hopping configuration for sidelink reference signaling, wherein the frequency hopping configuration is based at least in part on a set of sidelink frequency hopping parameters. The apparatus may include means for transmitting a reference signal using the frequency hopping configuration.

Some aspects described herein provide an apparatus for wireless communication. The apparatus may include means for transmitting, to a first UE, a set of sidelink frequency hopping parameters for reference signaling by one or more second UEs of a sidelink network. The apparatus may include means for receiving reference signal reporting based at least in part on the set of sidelink frequency hopping parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
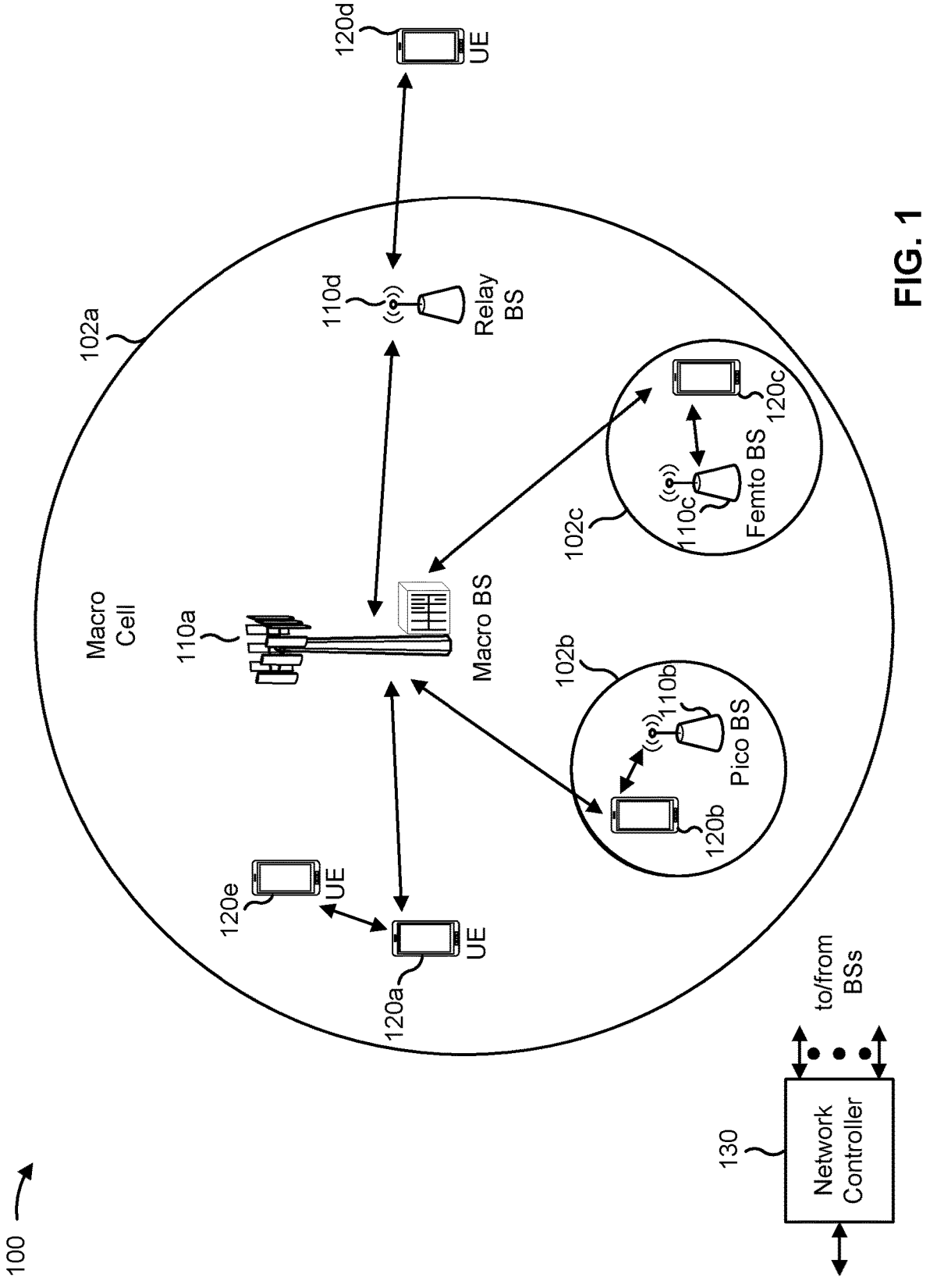
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, as described in connection with FIGS. 3-4, the UE 120 may perform scheduling operations, resource selection operations, and/or other operations described elsewhere herein as being performed by the base station 110. In some aspects, two or more UEs 120 may determine channel state information (CSI) based at least in part on a CSI reference signal transmitted on a sidelink by one of the two or more UEs 120.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
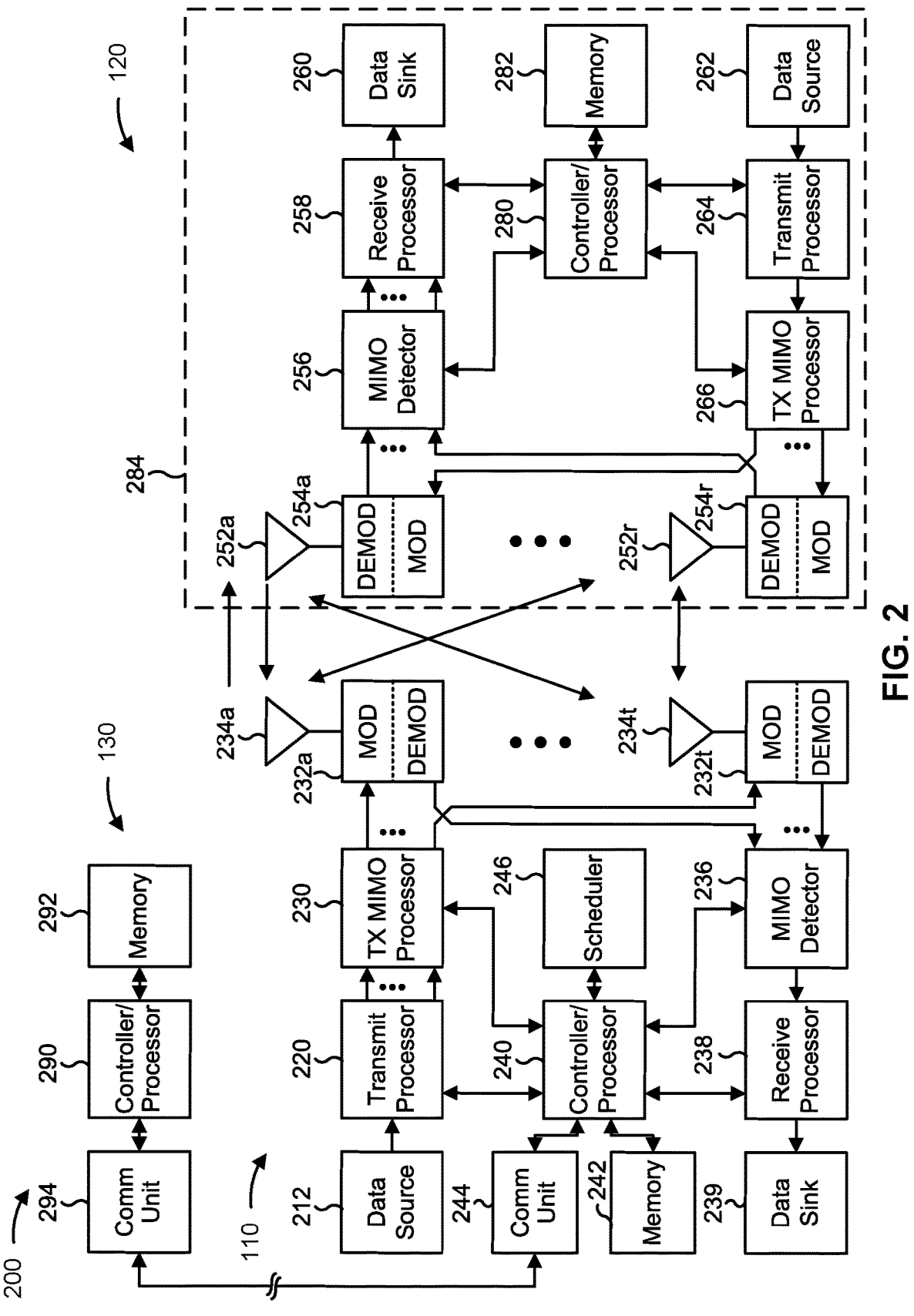
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-12).

Controller/processor 240 of base station 110, controller/processor 280 of UE 120, and/or any other component(s) of FIG. 2 may perform one or more techniques associated with frequency hopping coordination and configuration for sidelink communication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a first UE (e.g., UE 120) includes means for receiving, from a base station, a set of sidelink frequency hopping parameters; and/or means for transmitting, to a second UE via a sidelink interface, a frequency hopping configuration for sidelink reference signaling by the second UE, wherein the frequency hopping configuration is based at least in part on the set of sidelink frequency hopping parameters. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting respective frequency hopping configurations for sidelink reference signaling by each of the plurality of second UEs, wherein the respective frequency hopping configurations are based at least in part on the set of sidelink frequency hopping parameters.

In some aspects, the first UE includes means for receiving a reference signal from the second UE based at least in part on the frequency hopping configuration.

In some aspects, the first UE includes means for receiving feedback regarding sidelink reference signaling by the second UE based at least in part on the frequency hopping configuration.

In some aspects, the first UE includes means for receiving, from a second UE via a sidelink interface, a frequency hopping configuration for sidelink reference signaling, wherein the frequency hopping configuration is based at least in part on a set of sidelink frequency hopping parameters; and/or means for transmitting a reference signal using the frequency hopping configuration. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for transmitting the reference signal on a reference signal resource determined based at least in part on the frequency hopping configuration.

In some aspects, the first UE includes means for determining feedback regarding sidelink reference signaling by another UE based at least in part on the frequency hopping configuration; and/or means for transmitting the feedback to the second UE.

In some aspects, the base station includes means for transmitting, to a first UE, a set of sidelink frequency hopping parameters for reference signaling by one or more second UEs of a sidelink network; and/or means for receiving reference signal reporting based at least in part on the set of sidelink frequency hopping parameters. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting respective sets of frequency hopping parameters for sidelink reference signaling associated with the plurality of first UEs, wherein the respective sets of frequency hopping parameters are associated with respective reference signal resource allocations that are orthogonal to each other.

In some aspects, the base station includes means for receiving a reference signal from the one or more second UEs based at least in part on the set of frequency hopping parameters.

In some aspects, the base station includes means for receiving feedback regarding sidelink reference signaling by the one or more second UEs based at least in part on the set of frequency hopping parameters.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
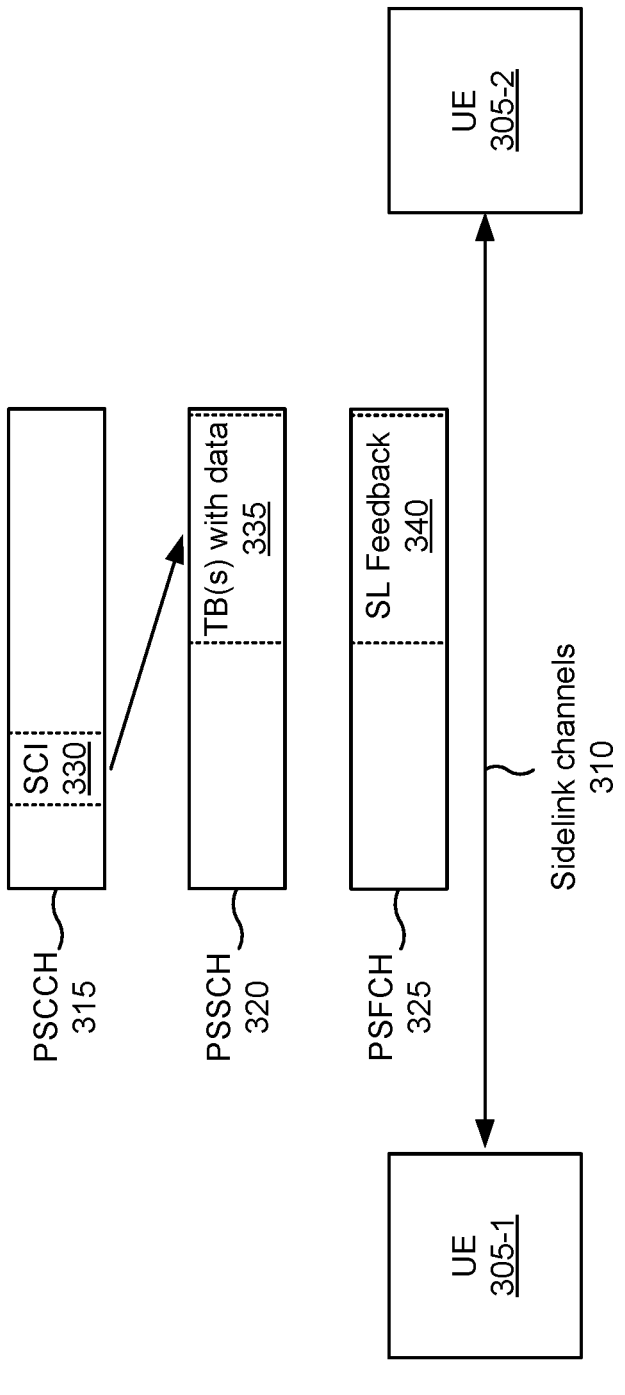
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. A scheduling assignment (e.g., included in SCI 330) may be transmitted in sub-channels using specific resource blocks (RBs), which may be included in a resource pool. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, the UE 305 may transmit channel state information (CSI) signaling. For example, a first UE 305 may transmit a CSI reference signal (CSI-RS) and a second UE 305 may determine CSI based at least in part on the CSI reference signal. In some aspects, the second UE 305 may transmit a CSI report to the first UE 305 indicating the CSI. The transmission of the CSI report may be referred to as CSI feedback. CSI reporting may be supported for unicast communications.

A transmitter UE 305 may trigger a CSI report explicitly in SCI (e.g., SCI 330) and may include a CSI-RS in the associated PSSCH. A receiver UE 305 may report CSI via a medium access control control element (MAC-CE). In one example, the CSI may include 1 bit for a rank indicator (RI) and 4 bits for a channel quality indicator (CQI). An RI may indicate a supported rank (e.g., a maximum number of antennas) for communications via a channel A CQI may indicate a highest supported modulation scheme and code rate for communications via the channel. In some aspects, a UE 305 may support a phase-tracking reference signal (PT-RS or PTRS), such as in FR2. The number of PT-RS ports (e.g., the number of ports used to generate and/or transmit the PT-RS) may follow the number of DMRS ports.

As indicated above, FIG. 3 is provided as an example. Other examples may differ from what is described with respect to FIG. 3.

Figure 4:
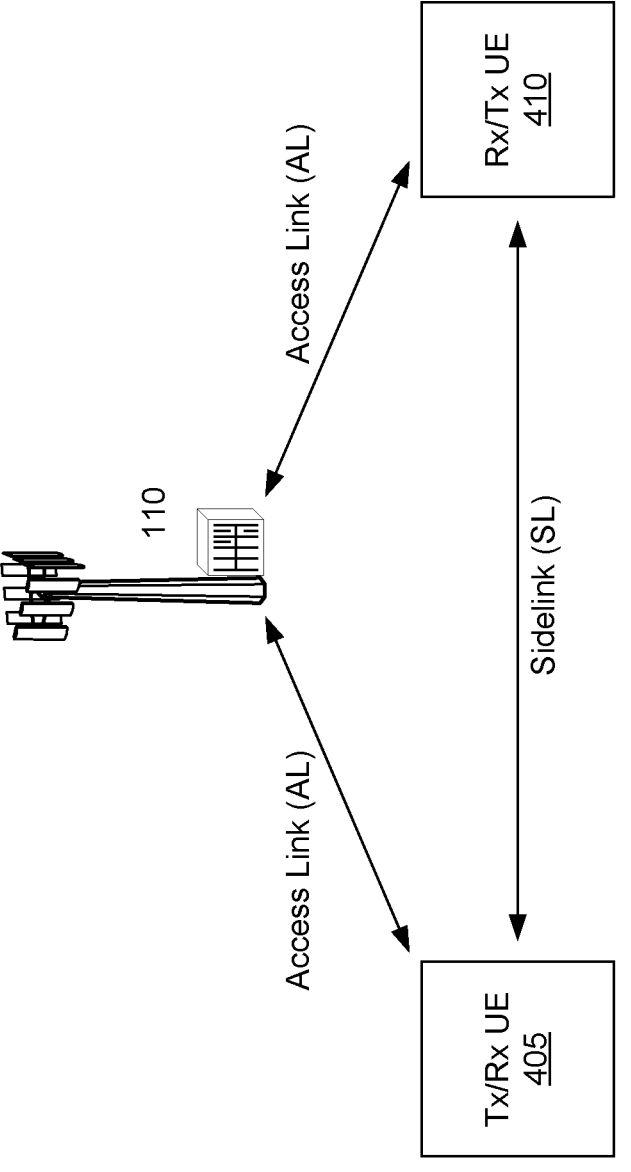
FIG. 4 is a diagram illustrating an example of sidelink communications and access link communications, in accordance with the present disclosure.
Figure 4:

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, a UE 405 may communicate via the sidelink with a group of UEs 410. For example, the UE 405 may act as a relay UE for the group of UEs 410. In some sidelink communication modes, the UE 405 may handle scheduling and resource allocation for the group of UEs 410, for example, based at least in part on a configuration received from a base station 110. In some aspects, described in more detail elsewhere herein, the UE 405 may configure the group of UEs 410 with reference signal resources, for example, for the transmission or reception of CSI reporting and/or CSI-RSs.

As indicated above, FIG. 4 is provided as an example. Other examples may differ from what is described with respect to FIG. 4.

A first UE in a sidelink network may transmit a CSI-RS, and a second UE may determine and transmit CSI reporting based at least in part on the CSI-RS. In many situations, a UE (e.g., a relay UE) may be associated with a group of UEs (e.g., remote UEs). For example, the UE may provide relaying services for the group of UEs. In this case, it may be beneficial for the group of UEs to perform CSI-RS transmission and/or CSI reporting, such as to support communications of the UE. Collisions between CSI-RSs and/or CSI reporting diminishes the accuracy of CSI, and it is beneficial to avoid such collisions. Thus, different UEs can be assigned different resources (e.g., orthogonal resources) for CSI. One approach for assigning different resources to UEs of a group of UEs is a time division multiplexing (TDM) approach, in which different UEs are assigned different time resources. However, the TDM approach may lead to variability in the timeliness of CSI for some UEs (e.g., some UEs may be assigned TDM resources that occur later than the TDM resources of other UEs). Furthermore, in some deployments, a single gNB (referred to herein as a base station) may manage multiple relay UEs. In this case, the base station may benefit from the remote UEs of each relay UE having orthogonal resources for CSI. However, if each relay UE is configured with the same set of resources to be allocated for each relay UE's remote UE(s), then collisions between remote UEs associated with different relay UEs may occur, which diminishes the accuracy of CSI and uses network resources associated with retransmission of CSI.

Some techniques and apparatuses described herein enable allocation of resources for CSI signaling (e.g., CSI-RS or the like) based at least in part on a frequency hopping technique. By using the frequency hopping technique, UEs of a sidelink network can be configured with orthogonal resources for CSI signaling, which improves efficiency and efficacy of CSI signaling and reduces delay associated with CSI signaling relative to a TDM approach. Furthermore, a base station may configure a respective set of sidelink frequency hopping parameters for one or more relay UEs associated with the base station, where the respective sets of sidelink frequency hopping parameters are designed to provide CSI resource allocations that are orthogonal to each other. Thus, each relay UE can configure one or more remote UEs for CSI-RS transmission using a frequency hopping configuration that complies with a corresponding set of sidelink frequency hopping parameters, and the resources indicated by the frequency hopping configuration may be orthogonal between remote UEs associated with a given relay UE, and between remote UEs associated with different relay UEs, which improves efficiency and efficacy of CSI signaling.

Figure 5:
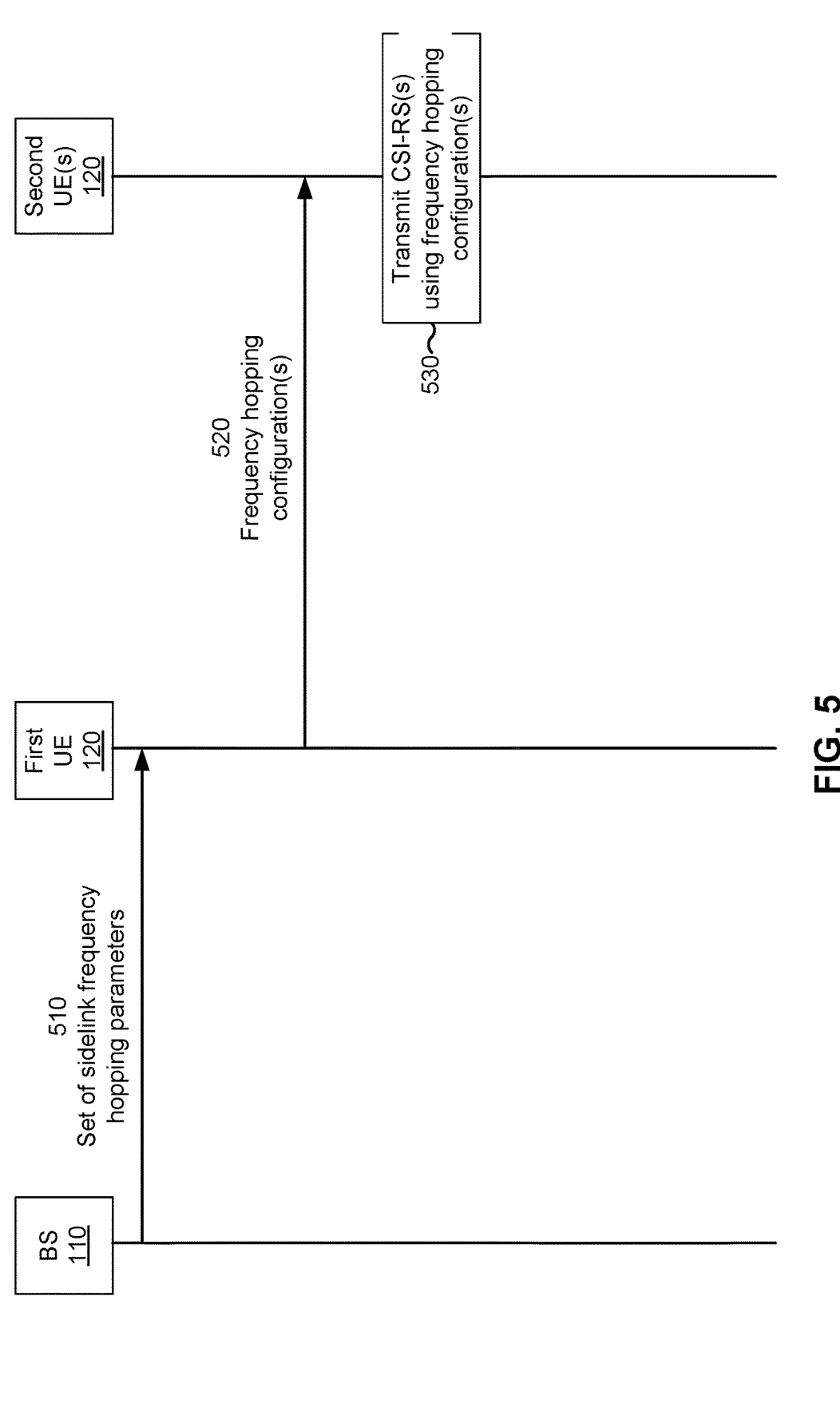
FIG. 5 is a diagram illustrating an example of signaling associated with frequency hopping configuration for channel state information (CSI) signaling in a sidelink network, in accordance with the present disclosure.

FIG. 5 is a diagram illustrating an example 500 of signaling associated with frequency hopping configuration for CSI signaling in a sidelink network, in accordance with the present disclosure. As shown, example 500 includes a BS 110, a first UE 120, and a group of second UEs 120. In some aspects, the first UE 120 may be a relay UE and the group of second UEs 120 may be a group of remote UEs associated with the relay UE. For example, the first UE 120 may perform resource allocation for the group of second UEs 120. However, at least some of the techniques described herein can be applied for a deployment of UEs that are not associated with a relay UE. In some aspects, the group of second UEs 120 may be associated with an active connection (e.g., an active sidelink connection and/or an active radio resource control (RRC) connection) with the first UE 120.

As shown in FIG. 5, and by reference number 510, the BS 110 may transmit (e.g., using controller/processor 240, transmit processor 220, TX MIMO processor 230, MOD 232, antenna 234, and/or the like), to the first UE 120, a set of sidelink frequency hopping parameters. The first UE 120 may receive (e.g., using antenna 252, DEMOD 254, MIMO detector 256, receive processor 258, controller/processor 280, and/or the like) the set of sidelink frequency hopping parameters. A sidelink frequency hopping parameter may relate to a frequency hopping pattern, a frequency hopping bandwidth, a frequency hopping allocation, or the like. For example, a sidelink frequency hopping parameter may indicate at least one of a frequency domain shift position, a size of a subband to be hopped, a number of subbands to be hopped, one or more entries of a table that specifies a total bandwidth for hopping, or the like. These parameters are described in more detail in connection with FIG. 6, below. A subband is a frequency-domain division of a communication band. The communication band may include a wideband, a resource pool, an operating band of a UE, or the like.

In some aspects, the BS 110 may transmit multiple sets of sidelink frequency hopping parameters. For example, in some deployments, the BS 110 may be associated with multiple first UEs 120, where each first UE 120 is associated with one or more second UEs 120. In this case, the BS 110 may transmit a respective set of sidelink frequency hopping parameters for each of the multiple first UEs 120. In some aspects, two or more sets of sidelink frequency hopping parameters may be associated with respective reference signal resource allocations that are orthogonal to each other. For example, a first set of sidelink frequency hopping parameters may indicate a first set of resources and a second set of sidelink frequency hopping parameters may indicate a second set of resources that are orthogonal to the first set of resources. As used herein, a first resource is orthogonal to a second resource if the first resource and the second resource occupy different time and frequency allocations (i.e., if the first resource and the second resource do not overlap in both time and frequency). A first set of resources is orthogonal to a second set of resources if no resource of the first set of resources overlaps any resource of the second set of resources. Thus, the BS 110 can configure multiple relay UEs 120 with respective sets of sidelink frequency hopping parameters, and each relay UE 120 can configure one or more remote UEs 120 with sidelink frequency hopping parameters such that CSI-RSs transmitted by the remote UEs 120 do not collide with each other.

In some aspects, the BS 110 may configure first UEs 120 with a table that indicates one or more sidelink frequency hopping parameters. In some aspects, the table may be preconfigured (e.g., loaded in the memory of the UE, as compared to a table configured via radio resource control signaling), or may be specified by a wireless communication standard (e.g., in which case the table may be indicated via radio resource control signaling). For example, the table may include rows that each indicate a frequency hopping tree. A frequency hopping tree may indicate respective frequency hopping sequences, and each frequency hopping sequence can be used to determine resources for transmission of a CSI-RS. The BS 110 may indicate, in the set of sidelink frequency hopping parameters, one or more rows of the table to the first UEs 120. In some aspects, the BS 110 may assign (e.g., via the set of sidelink frequency hopping parameters) different sets of frequency domain shift positions to the first UEs 120, such that the first UEs 120 configure the second UEs 120 with different frequency domain shift positions for a frequency hopping sequence, thereby ensuring orthogonality of CSI-RS transmissions by the second UEs 120 since each of the second UEs 120 may start at a different position in the frequency hopping sequence. Further detail regarding the usage of the set of sidelink frequency hopping parameters is provided in connection with FIG. 6.

In some aspects, a sidelink frequency hopping parameter (e.g., of a set of sidelink frequency hopping parameters) may be associated with a resource pool (e.g., a group of contiguous resource blocks associated with a periodicity on which sidelink communication occurs). For example, different resource pools may have different configurations of one or more frequency hopping parameters. In this case, in some aspects, the sidelink frequency hopping parameter may be configured in connection with configuring the resource pool.

In some aspects, a sidelink frequency hopping parameter may be associated with a source identifier. For example, different source identifiers may be configured with different sidelink frequency hopping parameters. A source identifier may identify a source associated with a sidelink (e.g., an identity of a source UE of a transmission on the sidelink). In some aspects, a sidelink frequency hopping parameter may be associated with a destination identifier. For example, different destination identifiers may be configured with different sidelink frequency hopping parameters. A destination identifier may identify a destination associated with a sidelink (e.g., an identity of a destination UE of a transmission on the sidelink). In some aspects, a sidelink frequency hopping parameter may be associated with a subchannel. For example, different subchannels of a sidelink may be configured with different frequency hopping parameters. A subchannel may include a frequency-domain division of frequency resources of a sidelink, such as a number of resource blocks of a resource pool. For example, a resource pool may be divided into N subchannels, where N is a configurable integer.

As shown by reference number 520, the first UE 120 may transmit (e.g., using controller/processor 280, transmit processor 264, TX MIMO processor 266, MOD 254, antenna 252, and/or the like) frequency hopping configurations to the group of second UEs 120. A second UE 120 of the group of second UEs 120 (e.g., using antenna 252, DEMOD 254, MIMO detector 256, receive processor 258, controller/processor 280, and/or the like) may receive one or more of the frequency hopping configurations. A frequency hopping configuration may be based at least in part on a set of sidelink frequency hopping parameters. For example, a frequency hopping configuration may include one or more sidelink frequency hopping parameters of the set of sidelink frequency hopping parameters, or may include one or more sidelink frequency hopping parameters selected based at least in part on the set of sidelink frequency hopping parameters. In some aspects, the first UE 120 may transmit respective frequency hopping configurations to multiple second UEs 120 (e.g., one frequency hopping configuration per second UE 120). For example, the respective sidelink frequency hopping parameters may be different from each other (e.g., may specify different frequency domain shift positions, may indicate respective reference signal resource allocations that are orthogonal to each other, or the like).

In some aspects, the first UE 120 may determine a frequency hopping configuration based at least in part on a sidelink frequency hopping parameter. For example, if a sidelink frequency hopping parameter is associated with a particular resource pool, the first UE 120 may provide, for the particular resource pool, a frequency hopping configuration that includes the sidelink frequency hopping parameter associated with the particular resource pool. As another example, the first UE 120 may determine a frequency hopping configuration based at least in part on a source identifier and/or a destination identifier associated with a sidelink and/or a second UE 120, and based at least in part on the source identifier and/or the destination identifier being associated with a sidelink frequency hopping parameter. As yet another example, the first UE 120 may determine a frequency hopping configuration based at least in part on a set of subchannels. For example, if the set of subchannels is associated with a particular sidelink frequency hopping parameter, and if the first UE 120 determines that a second UE 120 is to perform frequency hopping within the set of subchannels, the first UE 120 may transmit a frequency hopping configuration that includes the particular sidelink frequency hopping parameter.

As shown by reference number 530, the group of second UEs 120 may transmit (e.g., using controller/processor 280, transmit processor 264, TX MIMO processor 266, MOD 254, antenna 252, and/or the like) reference signals using the frequency hopping configurations provided by the first UE 120. For example, a second UE 120, of the group of second UEs 120, may determine a set of resources for transmission of a reference signal such as a CSI-RS. The second UE 120 may determine the set of resources based at least in part on the frequency hopping configuration. For example, the second UE 120 may use Equation 1, described below in connection with FIG. 6, to determine the set of resources. A resource used to transmit a reference signal may be referred to herein as a reference signal resource.

In some aspects, a UE 120 or a BS 110 may receive a reference signal based at least in part on a frequency hopping configuration. For example, a UE 120 (e.g., a first UE 120 or a second UE 120) or a BS 110 may determine a reference signal resource associated with a CSI-RS based at least in part on a frequency hopping configuration, and may determine CSI feedback based at least in part on a CSI-RS received in the reference signal resource. Thus, frequency hopping is supported for transmission and reception of sidelink CSI-RSs.

In some aspects, first UE 120, second UE 120, or BS 110 may receive CSI reporting based at least in part on a frequency hopping configuration. For example, if second UE 120 transmits a CSI-RS in accordance with a frequency hopping configuration, first UE 120 may determine a CSI report based at least in part on the CSI-RS, and may transmit the CSI report to the BS 110. If first UE 120 transmits a CSI-RS in accordance with a frequency hopping configuration, second UE 120 may determine a CSI report based at least in part on the CSI-RS, and may transmit the CSI report to first UE 120 or BS 110.

As indicated above, FIG. 5 is provided as an example. Other examples may differ from what is described with regard to FIG. 5.

Figure 6:
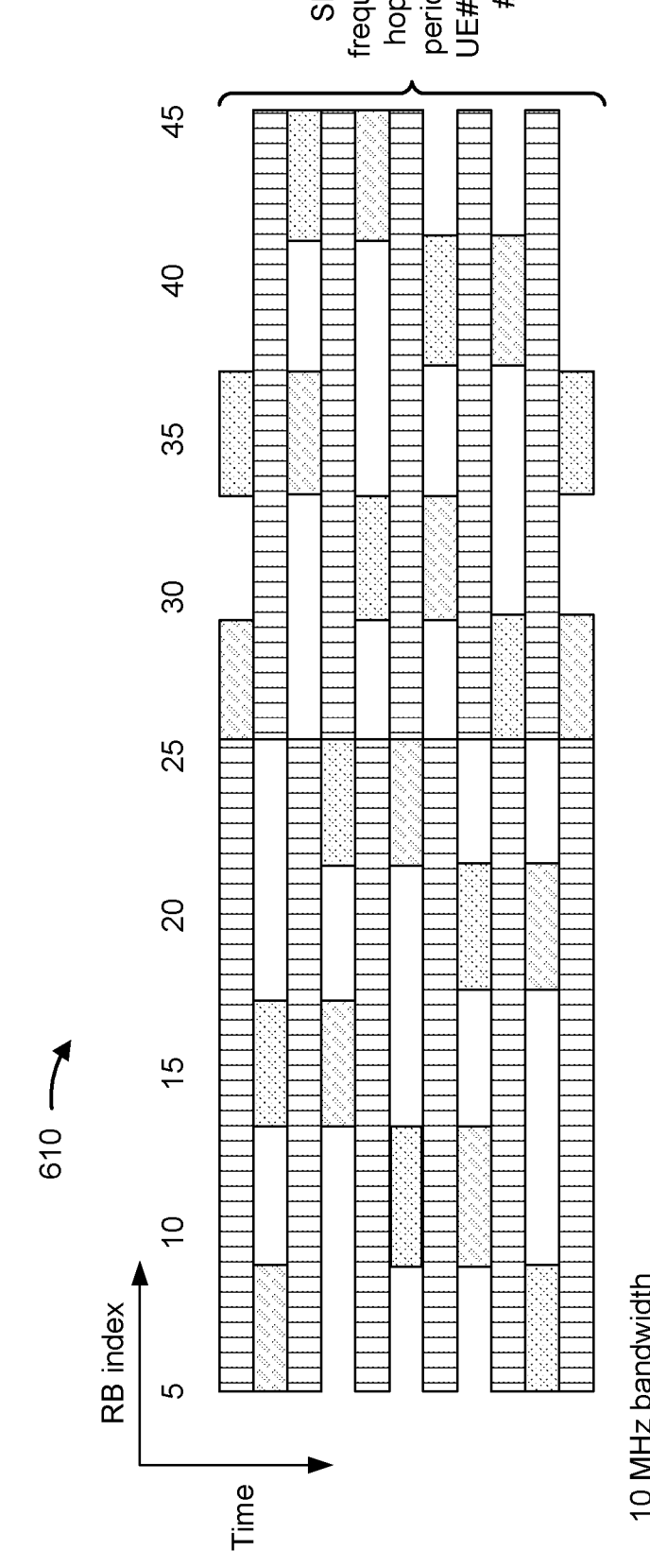
FIG. 6 is a diagram illustrating an example relating to frequency hopping for a CSI reference signal (CSI-RS) in a sidelink network, in accordance with the present disclosure.

FIG. 6 is a diagram illustrating an example 600 relating to frequency hopping for a CSI-RS in a sidelink network, in accordance with the present disclosure. FIG. 6, and the description accompanying FIG. 6, describes how a UE can determine a set of reference signal resources for transmission or reception of a CSI-RS using frequency hopping.

The sidelink frequency hopping parameters described in connection with FIG. 5 may configure a UE 120 to perform subband hopping (also referred to herein as frequency hopping). Subband hopping may be performed based at least in part on a predetermined sequence and a set of sidelink frequency hopping parameters. For example, the UE may determine frequency hopping occasions based at least in part on the predetermined sequence, and may use the frequency hopping occasions as reference signal resources (or may determine reference signal resources based at least in part on the frequency hopping occasions). Some sidelink frequency hopping parameters may be signaled to the UE 120, and others may be determined by the UE 120 (e.g., based at least in part on another sidelink frequency hopping parameter). The set of sidelink frequency hopping parameters may include, for example, a frequency domain shift position $n_{RRC}$, a size of each subband to be hopped $m_{CSIRS,b}$, a number of subbands to be hopped $N_b$ (which may be determined based at least in part on a row of a table, where the table is defined by a wireless communication specification or signaled to the UE), and a CSI-RS counter $n_{CSIRS}$. For an aperiodic CSI-RS resource, $n_{CSIRS}$ may be given by $n_{CSIRS}=[l'/R]$, wherein R is a number of repetitions inside the CSI-RS resource and $l' \in \{0, 1, \ldots, N_{symb}^{CSIRS}-\}$ is the counter of the CSI-RS symbol. For a periodic CSI-RS resource, $n_{CSIRS}$ may be given by $$n_{CSIRS} = \left( \frac{N_{slot}^{frame,\mu} n_f + n_{s,f}^{\mu} - T_{offset}}{T_{CSIRS}} \right) \cdot \left( \frac{N_{symb}^{CSIRS}}{R} \right) + \left\lfloor \frac{l'}{R} \right\rfloor,$$

wherein $T_{CSIRS}$ and $T_{offset}$ identify a periodicity and offset within a frame.

The subband hopping may be based at least in part on a parameter $n_b$, where $$n_b = \begin{cases} \lfloor 4n_{RRC}/m_{CSIRS,b} \rfloor \bmod N_b & b \le b_{hop} \\ (F_b(n_{CSIRS}) + \lfloor 4n_{RRC}/m_{CSIRS,b} \rfloor) \bmod N_b & \text{otherwise} \end{cases}.$$

For example, n b may identify frequency position indices of frequency hopping occasions. $N_{b_{hop}}=1$ regardless of the value of $N_b$. $N_b$ may be a subband index, and may control the index of the subband hop of each CSI-RS occasion (l'). In some aspects, $N_b$ may be given by a table, such as a table defined in a wireless communication standard or signaled to the UE 120. $N_b$ may be a function of $n_{RRC}$ and Equation 1, shown below:

19

$$F_b(n_{CSIRS}) = \begin{cases} (N_b/2)\left\lfloor \dfrac{n_{CSIRS}\bmod \prod_{b'=b_{hop}}^{b} N_{b'}}{\prod_{b'=b_{hop}}^{b-1} N_{b'}} \right\rfloor + \\[2ex] \left\lfloor \dfrac{n_{CSIRS}\bmod \prod_{b'=b_{hop}}^{b} N_{b'}}{2\prod_{b'=b_{hop}}^{b-1} N_{b'}} \right\rfloor & \text{if } N_b \text{ even} \\[3ex] \left\lfloor N_b/2 \right\rfloor \left\lfloor n_{CSIRS} / \prod_{b'=b_{hop}}^{b-1} N_{b'} \right\rfloor & \text{if } N_b \text{ odd} \end{cases}$$

Equation 1

As mentioned above, a first UE 120 may signal, to a second UE 120, a frequency hopping configuration determined based at least in part on a set of sidelink frequency hopping parameters. The frequency hopping configuration may indicate, for example, a frequency domain shift position, a size of each subband to be hopped, a number of subbands to be hopped, and a row in Example Table 1, shown below, indicating a total bandwidth $N_B$ for the frequency hopping. For example, the first UE 120 may signal a value of $C_{CSIRS}$, and the second UE 120 may determine $N_B$ based at least in part on values of $C_{CSIRS}$ and $B_{CSIRS}$. Example Table 1 is provided as an example, and may include additional entries and/or different entries than those shown below.

EXAMPLE TABLE 1

| $C_{CSIRS}$ | $B_{CSIRS}=0$ | | $B_{CSIRS}=1$ | | $B_{CSIRS}=2$ | | $B_{CSIRS}=3$ | |
|---|---|---|---|---|---|---|---|---|
| | $m_{CSIRS,\,0}$ | $N_0$ | $m_{CSIRS,\,1}$ | $N_1$ | $m_{CSIRS,\,2}$ | $N_2$ | $m_{CSIRS,\,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| . . . | . . . | . . . | . . . | . . . | . . . | . . . | . . . | . . . |

Reference number 610 shows examples of frequency hopping occasions that may be determined by second UEs 120, shown as UE #1, UE #2, and UE #3. The example shown by reference number 610 corresponds to row 11 of Example Table 1. As shown, the UEs 120 of FIG. 6 are associated with orthogonal frequency hopping occasions, meaning that the UEs 120 of FIG. 6 can transmit CSI-RSs without collisions between the CSI-RSs. If UE #1 were a first UE 120 (e.g., a relay UE associated with one or more remote UEs), then UE #1 may be capable of configuring one or more remote UEs with a frequency hopping configuration that provides frequency hopping occasions within the frequency hopping occasions associated with UE #1 (which are marked by a vertical lined fill).

In some aspects, the BS 110 may configure multiple different first UEs 120 with respective sets of sidelink frequency hopping parameters. In some aspects, at least one sidelink frequency hopping parameter may be shared between the multiple different first UEs 120. For example, the BS 110 may configure two or more first UEs 120 with the same value of $C_{CSIRS}$. In this case, the BS 110 and/or the two or more first UEs 120 may achieve orthogonality in frequency hopping occasions by way of different frequency domain shift positions. For example, in the example shown by reference number 610, each of UE #1, UE #2, and UE #3 may be associated with a same value of $C_{CSIRS}$, and may be associated with different frequency domain shift positions.

As indicated above, FIG. 6 is provided as an example. Other examples may differ from what is described with regard to FIG. 6.

Figure 7:
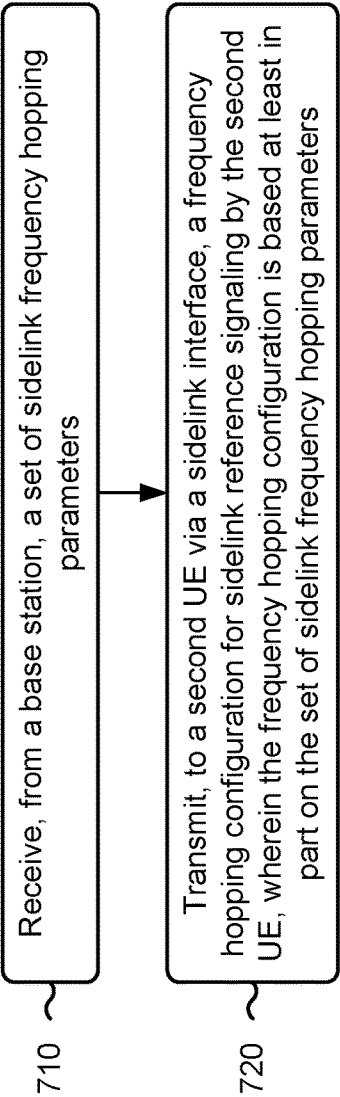
FIGS. 7-9 are diagrams illustrating example processes associated with frequency hopping coordination and configuration for sidelink communication, in accordance with the present disclosure.

FIG. 7 is a diagram illustrating an example process 700 performed, for example, by a UE, in accordance with the present disclosure. Example process 700 is an example where a first UE (e.g., UE 120) performs operations associated with frequency hopping coordination and configuration for sidelink communication.

As shown in FIG. 7, in some aspects, process 700 may include receiving, from a base station, a set of sidelink frequency hopping parameters (block 710). For example, the first UE (e.g., using reception component 1002, depicted in FIG. 10) may receive, from a base station, a set of sidelink frequency hopping parameters, as described above, for example, in connection with reference number 510 of FIG. 5.

As further shown in FIG. 7, in some aspects, process 700 may include transmitting, to a second UE via a sidelink interface, a frequency hopping configuration for sidelink reference signaling by the second UE, wherein the frequency hopping configuration is based at least in part on the set of sidelink frequency hopping parameters (block 720). For example, the first UE (e.g., using transmission component 1004, depicted in FIG. 10) may transmit, to a second UE via a sidelink interface, a frequency hopping configuration for sidelink reference signaling by the second UE, wherein the frequency hopping configuration is based at least in part on the set of sidelink frequency hopping parameters, as described above, for example, in connection with reference number 520 of FIG. 5.

Process 700 may include additional aspects, such as any single aspect or any combination of aspects described below and/or in connection with one or more other processes described elsewhere herein.

In a first aspect, the frequency hopping configuration includes one or more sidelink frequency hopping parameters selected from the set of sidelink frequency hopping parameters. In a second aspect, alone or in combination with the first aspect, the second UE is one of a plurality of second UEs, and process 700 further comprises transmitting respective frequency hopping configurations for sidelink reference signaling by each of the plurality of second UEs, wherein the respective frequency hopping configurations are based at least in part on the set of sidelink frequency hopping parameters. In a third aspect, alone or in combination with one or more of the first and second aspects, the respective frequency hopping configurations are associated with side-link frequency hopping parameters that are different from each other. In a fourth aspect, alone or in combination with one or more of the first through third aspects, the different sidelink frequency hopping parameters comprise respective frequency domain shift positions. In a fifth aspect, alone or in combination with one or more of the first through fourth aspects, the respective frequency hopping configurations are associated with respective reference signal resource allocations that are orthogonal to each other.

In a sixth aspect, alone or in combination with one or more of the first through fifth aspects, the second UE is associated with an active sidelink connection with the first UE. In a seventh aspect, alone or in combination with one or more of the first through sixth aspects, the frequency hopping configuration indicates a row of a table that indicates a set of reference signal resources for sidelink reference signaling. In an eighth aspect, alone or in combination with one or more of the first through seventh aspects, the set of sidelink frequency hopping parameters indicates at least one of a frequency domain shift position, a size of a subband to be hopped, a number of subbands to be hopped, or one or more entries of a table that specifies a total bandwidth for hopping.

In a ninth aspect, alone or in combination with one or more of the first through eighth aspects, process 700 includes receiving a reference signal from the second UE based at least in part on the frequency hopping configuration. In a tenth aspect, alone or in combination with one or more of the first through ninth aspects, process 700 includes receiving feedback regarding sidelink reference signaling by the second UE based at least in part on the frequency hopping configuration. In an eleventh aspect, alone or in combination with one or more of the first through tenth aspects, at least one sidelink frequency hopping parameter, of the set of sidelink frequency hopping parameters, is associated with at least one of a resource pool, a source identifier of a sidelink, a destination identifier of a sidelink, or a subchannel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
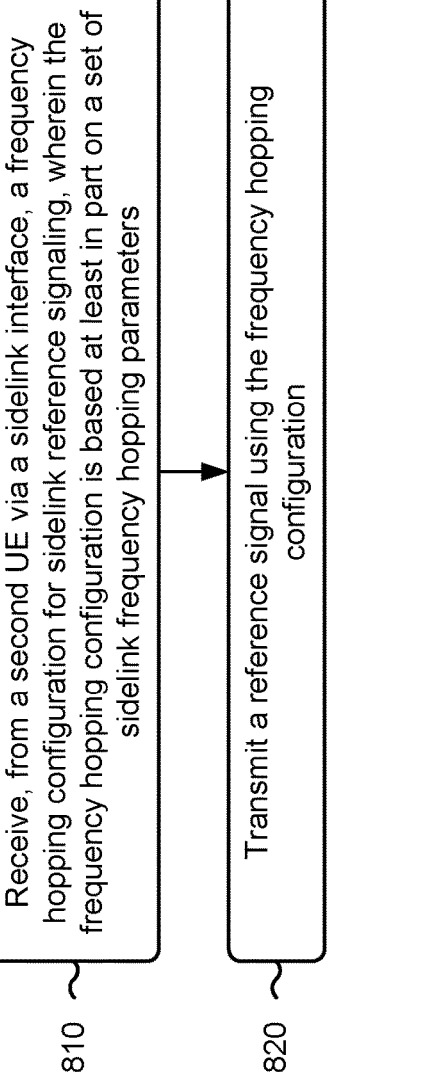

FIG. 8 is a diagram illustrating an example process 800 performed, for example, by a UE, in accordance with the present disclosure. Example process 800 is an example where a first UE (e.g., UE 120) performs operations associated with frequency hopping coordination and configuration for sidelink communication.

As shown in FIG. 8, in some aspects, process 800 may include receiving, from a second UE via a sidelink interface, a frequency hopping configuration for sidelink reference signaling, wherein the frequency hopping configuration is based at least in part on a set of sidelink frequency hopping parameters (block 810). For example, the first UE (e.g., using reception component 1102, depicted in FIG. 11) may receive, from a second UE via a sidelink interface, a frequency hopping configuration for sidelink reference signaling, wherein the frequency hopping configuration is based at least in part on a set of sidelink frequency hopping parameters, as described above, for example, in connection with reference number 520 of FIG. 5.

As further shown in FIG. 8, in some aspects, process 800 may include transmitting a reference signal using the frequency hopping configuration (block 820). For example, the first UE (e.g., using transmission component 1104, depicted in FIG. 11) may transmit a reference signal using the frequency hopping configuration, as described above, for example, in connection with reference number 530 of FIG. 5.

Process 800 may include additional aspects, such as any single aspect or any combination of aspects described below and/or in connection with one or more other processes described elsewhere herein.

In a first aspect, the frequency hopping configuration includes one or more sidelink frequency hopping parameters selected from the set of sidelink frequency hopping parameters. In a second aspect, alone or in combination with the first aspect, the frequency hopping configuration indicates a frequency domain shift position for the sidelink reference signaling.

In a third aspect, alone or in combination with one or more of the first and second aspects, the second UE is associated with an active sidelink connection with the first UE. In a fourth aspect, alone or in combination with one or more of the first through third aspects, the frequency hopping configuration indicates a row of a table that indicates a set of reference signal resources for sidelink reference signaling. In a fifth aspect, alone or in combination with one or more of the first through fourth aspects, the set of sidelink frequency hopping parameters indicates at least one of a frequency domain shift position, a size of a subband to be hopped, a number of subbands to be hopped, one or more entries of a table that specifies a total bandwidth for hopping, or a combination thereof.

In a sixth aspect, alone or in combination with one or more of the first through fifth aspects, transmitting the reference signal further comprises transmitting the reference signal on a reference signal resource determined based at least in part on the frequency hopping configuration. In a seventh aspect, alone or in combination with one or more of the first through sixth aspects, process 800 includes determining feedback regarding sidelink reference signaling by another UE based at least in part on the frequency hopping configuration, and transmitting the feedback to the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
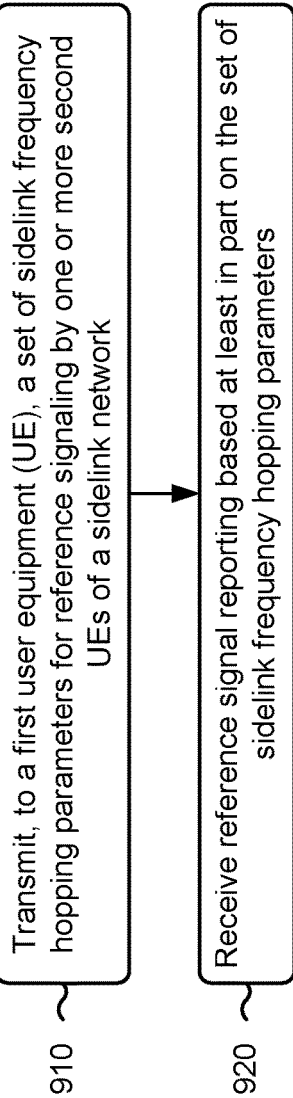
Figure 9:

FIG. 9 is a diagram illustrating an example process 900 performed, for example, by a base station, in accordance with the present disclosure. Example process 900 is an example where the base station (e.g., base station 110) performs operations associated with frequency hopping coordination and configuration for sidelink communication.

As shown in FIG. 9, in some aspects, process 900 may include transmitting, to a first UE, a set of sidelink frequency hopping parameters for reference signaling by one or more second UEs of a sidelink network (block 910). For example, the base station (e.g., using transmission component 1204, depicted in FIG. 12) may transmit, to a first UE, a set of sidelink frequency hopping parameters for reference signaling by one or more second UEs of a sidelink network, as described above, for example, in connection with reference number 510 of FIG. 5.

As further shown in FIG. 9, in some aspects, process 900 may include receiving reference signal reporting based at least in part on the set of sidelink frequency hopping parameters (block 920). For example, the base station (e.g., using reception component 1202, depicted in FIG. 12) may receive reference signal reporting based at least in part on the set of sidelink frequency hopping parameters, as described above, for example, in connection with FIG. 5.

Process 900 may include additional aspects, such as any single aspect or any combination of aspects described below and/or in connection with one or more other processes described elsewhere herein.

In a first aspect, the first UE is a relay UE associated with the one or more second UEs. In a second aspect, alone or in combination with the first aspect, the first UE is one of a plurality of first UEs, and process 900 further comprises transmitting respective sets of frequency hopping parameters for sidelink reference signaling associated with the plurality of first UEs, wherein the respective sets of frequency hopping parameters are associated with respective reference signal resource allocations that are orthogonal to each other.

In a third aspect, alone or in combination with one or more of the first and second aspects, the set of frequency hopping parameters indicates a row of a table that indicates a set of reference signal resources for sidelink reference signaling by the one or more second UEs. In a fourth aspect, alone or in combination with one or more of the first through third aspects, the set of sidelink frequency hopping parameters indicates at least one of a frequency domain shift position, a size of a subband to be hopped, a number of subbands to be hopped, or one or more entries of a table that specifies a total bandwidth for hopping.

In a fifth aspect, alone or in combination with one or more of the first through fourth aspects, process 900 includes receiving a reference signal from the one or more second UEs based at least in part on the set of frequency hopping parameters. In a sixth aspect, alone or in combination with one or more of the first through fifth aspects, process 900 includes receiving feedback regarding sidelink reference signaling by the one or more second UEs based at least in part on the set of frequency hopping parameters. In a seventh aspect, alone or in combination with one or more of the first through sixth aspects, a sidelink frequency hopping parameter, of the set of sidelink frequency hopping parameters, is associated with at least one of a resource pool, a source identifier of a sidelink, a destination identifier of a sidelink, or a subchannel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
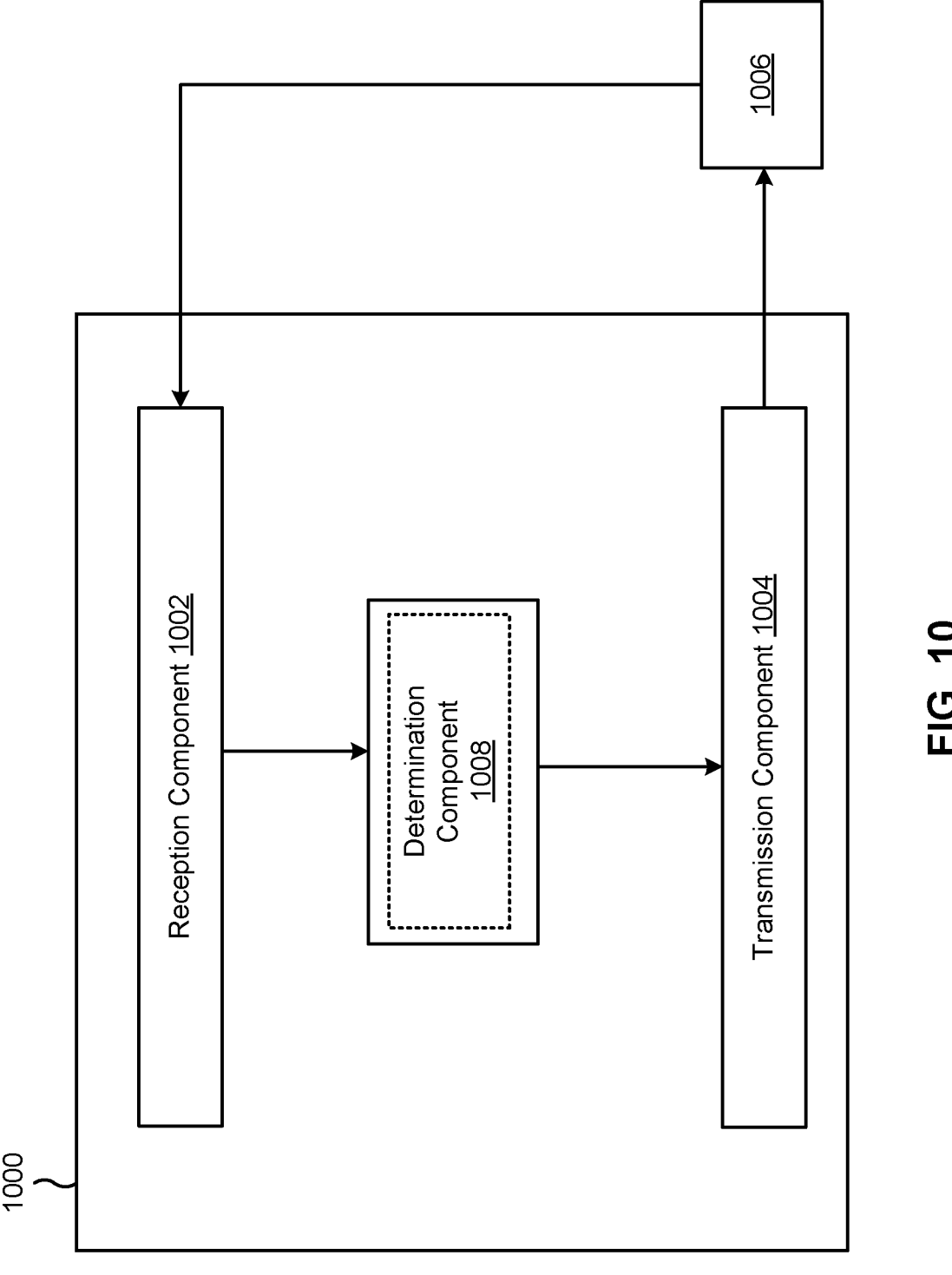
FIGS. 10-12 are block diagrams of example apparatuses for wireless communication, in accordance with the present disclosure.

FIG. 10 is a block diagram of an example apparatus 1000 for wireless communication. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 700 of FIG. 7, or a combination thereof. In some aspects, the apparatus 1000 and/or one or more components shown in FIG. 10 may include one or more components of the first UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the first UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the first UE described above in connection with FIG. 2. In some aspects, the transmission component 1004 may be co-located with the reception component 1002 in a transceiver.

The reception component 1002 may receive, from a base station, a set of sidelink frequency hopping parameters. The transmission component 1004 may transmit, to a second UE via a sidelink interface, a frequency hopping configuration for sidelink reference signaling by the second UE, wherein the frequency hopping configuration is based at least in part on the set of sidelink frequency hopping parameters. In some aspects, the determination component 1008 may determine a frequency hopping configuration based at least in part on the set of sidelink frequency hopping parameters.

The reception component 1002 may receive a reference signal from the second UE based at least in part on the frequency hopping configuration.

The reception component 1002 may receive feedback regarding sidelink reference signaling by the second UE based at least in part on the frequency hopping configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
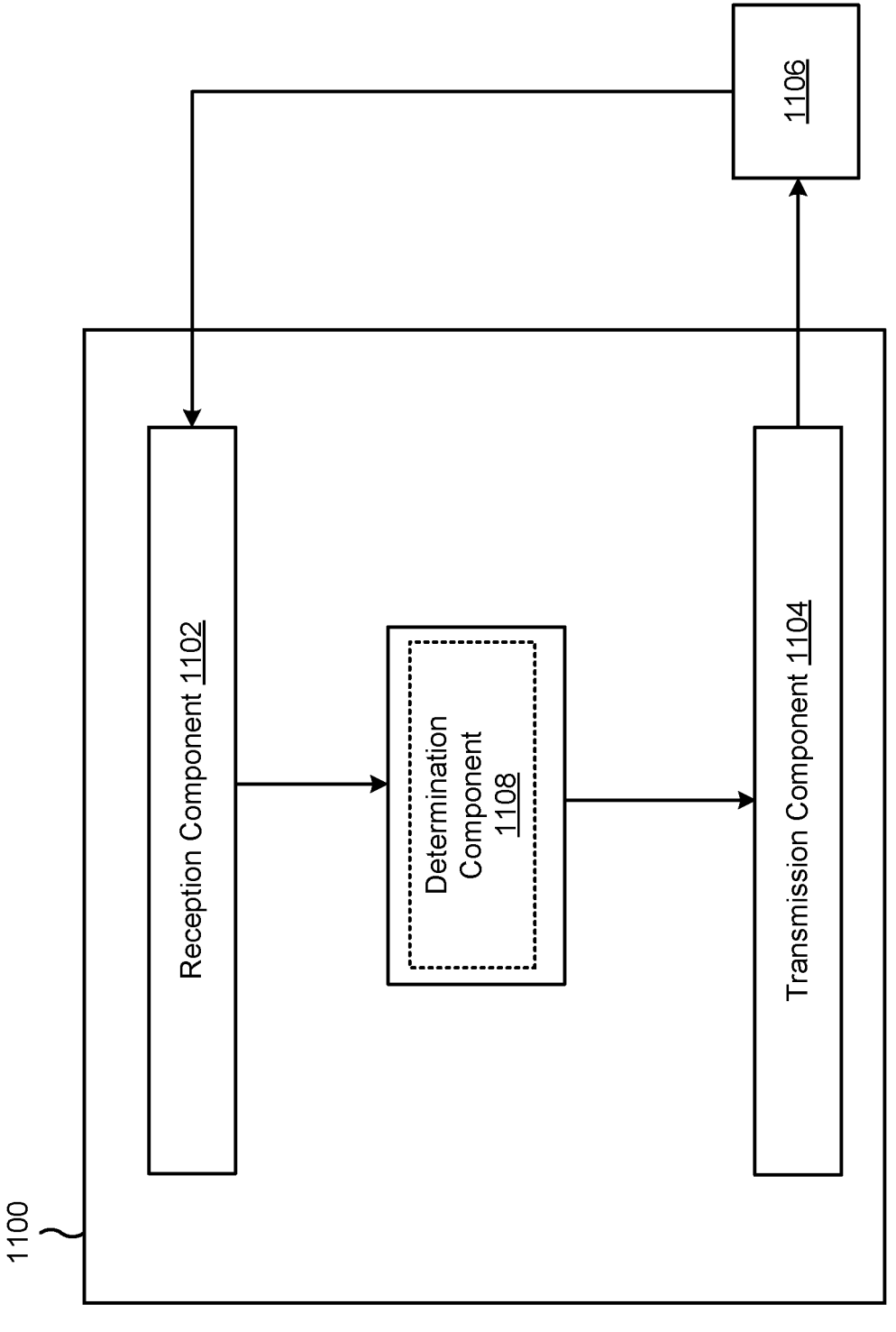

FIG. 11 is a block diagram of an example apparatus 1100 for wireless communication. The apparatus 1100 may be a first UE, or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the first UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the first UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first UE described above in connection with FIG. 2. In some aspects, the transmission component 1104 may be co-located with the reception component 1102 in a transceiver.

The reception component 1102 may receive, from a second UE via a sidelink interface, a frequency hopping configuration for sidelink reference signaling, wherein the frequency hopping configuration is based at least in part on a set of sidelink frequency hopping parameters. The transmission component 1104 may transmit a reference signal using the frequency hopping configuration. The determination component 1108 may determine one or more frequency hopping occasions for the transmission of the reference signal based at least in part on the frequency hopping configuration.

The determination component 1108 may determine feedback regarding sidelink reference signaling by another UE based at least in part on the frequency hopping configuration.

The transmission component 1104 may transmit the feedback to the second UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
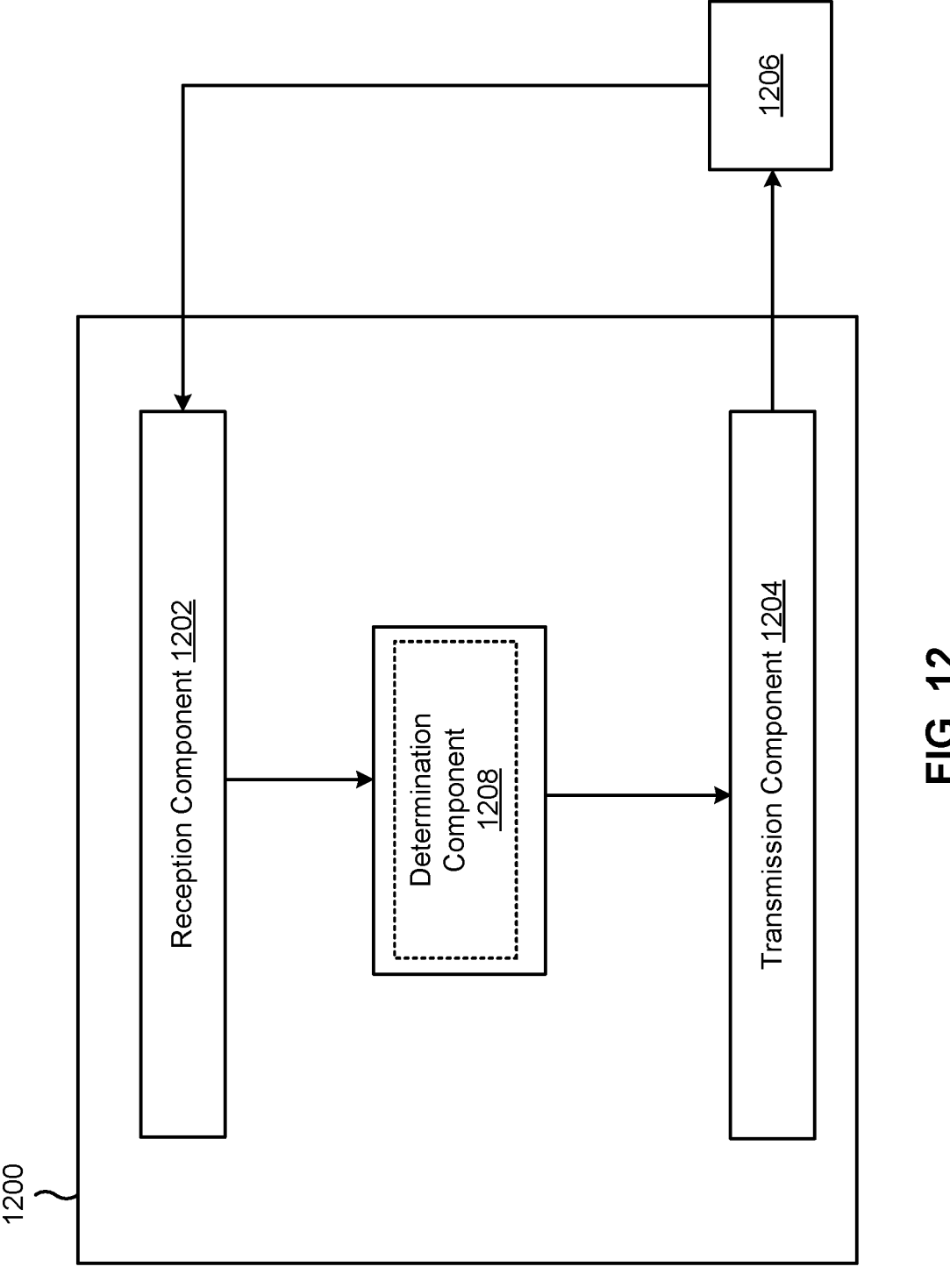

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a first UE, a set of sidelink frequency hopping parameters for reference signaling by one or more second UEs of a sidelink network. The reception component 1202 may receive reference signal reporting based at least in part on the set of sidelink frequency hopping parameters.

The reception component 1202 may receive a reference signal from the one or more second UEs based at least in part on the set of frequency hopping parameters.

The reception component 1202 may receive feedback regarding sidelink reference signaling by the one or more second UEs based at least in part on the set of frequency hopping parameters.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a first user equipment (UE), comprising: receiving, from a base station, a set of sidelink frequency hopping parameters; and transmitting, to a second UE via a sidelink interface, a frequency hopping configuration for sidelink reference signaling by the second UE, wherein the frequency hopping configuration is based at least in part on the set of sidelink frequency hopping parameters.

Aspect 2: The method of aspect 1, wherein the frequency hopping configuration includes one or more sidelink frequency hopping parameters selected from the set of sidelink frequency hopping parameters.

Aspect 3: The method of any of aspects 1-2, wherein the second UE is one of a plurality of second UEs, and wherein the method further comprises: transmitting respective frequency hopping configurations for sidelink reference signaling by each of the plurality of second UEs, wherein the respective frequency hopping configurations are based at least in part on the set of sidelink frequency hopping parameters.

Aspect 4: The method of aspect 3, wherein the respective frequency hopping configurations are associated with sidelink frequency hopping parameters that are different from each other.

Aspect 5: The method of aspect 4, wherein the different sidelink frequency hopping parameters comprise respective frequency domain shift positions.

Aspect 6: The method of aspect 3, wherein the respective frequency hopping configurations are associated with respective reference signal resource allocations that are orthogonal to each other.

Aspect 7: The method of any of aspects 1-6, wherein the second UE is associated with an active sidelink connection with the first UE.

Aspect 8: The method of any of aspects 1-7, wherein the frequency hopping configuration indicates a row of a table that indicates a set of reference signal resources for sidelink reference signaling.

Aspect 9: The method of any of aspects 1-8, wherein the set of sidelink frequency hopping parameters indicates at least one of: a frequency domain shift position, a size of a subband to be hopped, a number of subbands to be hopped, or one or more entries of a table that specifies a total bandwidth for hopping.

Aspect 10: The method of any of aspects 1-9, further comprising: receiving a reference signal from the second UE based at least in part on the frequency hopping configuration.

Aspect 11: The method of any of aspects 1-10, further comprising: receiving feedback regarding sidelink reference signaling by the second UE based at least in part on the frequency hopping configuration.

Aspect 12: The method of any of aspects 1-11, wherein at least one sidelink frequency hopping parameter, of the set of sidelink frequency hopping parameters, is associated with at least one of: a resource pool, a source identifier of a sidelink, a destination identifier of a sidelink, or a subchannel Aspect 13: A method of wireless communication performed by a first user equipment (UE), comprising: receiving, from a second UE via a sidelink interface, a frequency hopping configuration for sidelink reference signaling, wherein the frequency hopping configuration is based at least in part on a set of sidelink frequency hopping parameters; and transmitting a reference signal using the frequency hopping configuration.

Aspect 14: The method of aspect 13, wherein the frequency hopping configuration includes one or more sidelink frequency hopping parameters selected from the set of sidelink frequency hopping parameters.

Aspect 15: The method of any of aspects 13-14, wherein the frequency hopping configuration indicates a frequency domain shift position for the sidelink reference signaling.

Aspect 16: The method of any of aspects 13-15, wherein the second UE is associated with an active sidelink connection with the first UE.

Aspect 17: The method of any of aspects 13-16, wherein the frequency hopping configuration indicates a row of a table that indicates a set of reference signal resources for sidelink reference signaling.

Aspect 18: The method of any of aspects 13-17, wherein the set of sidelink frequency hopping parameters indicates at least one of: a frequency domain shift position, a size of a subband to be hopped, a number of subbands to be hopped, one or more entries of a table that specifies a total bandwidth for hopping, or a combination thereof Aspect 19: The method of any of aspects 13-18, wherein transmitting the reference signal further comprises: transmitting the reference signal on a reference signal resource determined based at least in part on the frequency hopping configuration.

Aspect 20: The method of any of aspects 13-19, further comprising: determining feedback regarding sidelink reference signaling by another UE based at least in part on the frequency hopping configuration; and transmitting the feedback to the second UE.

Aspect 21: A method of wireless communication performed by a base station, comprising: transmitting, to a first user equipment (UE), a set of sidelink frequency hopping parameters for reference signaling by one or more second UEs of a sidelink network; and receiving reference signal reporting based at least in part on the set of sidelink frequency hopping parameters.

Aspect 22: The method of aspect 21, wherein the first UE is a relay UE associated with the one or more second UEs.

Aspect 23: The method of any of aspects 21-22, wherein the first UE is one of a plurality of first UEs, and wherein the method further comprises: transmitting respective sets of frequency hopping parameters for sidelink reference signaling associated with the plurality of first UEs, wherein the respective sets of frequency hopping parameters are associated with respective reference signal resource allocations that are orthogonal to each other.

Aspect 24: The method of any of aspects 21-23, wherein the set of frequency hopping parameters indicates a row of a table that indicates a set of reference signal resources for sidelink reference signaling by the one or more second UEs.

Aspect 25: The method of any of aspects 21-24, wherein the set of sidelink frequency hopping parameters indicates at least one of: a frequency domain shift position, a size of a subband to be hopped, a number of subbands to be hopped, or one or more entries of a table that specifies a total bandwidth for hopping.

Aspect 26: The method of any of aspects 21-25, further comprising: receiving a reference signal from the one or more second UEs based at least in part on the set of frequency hopping parameters.

Aspect 27: The method of any of aspects 21-26, further comprising: receiving feedback regarding sidelink reference signaling by the one or more second UEs based at least in part on the set of frequency hopping parameters.

Aspect 28: The method of any of aspects 21-27, wherein a sidelink frequency hopping parameter, of the set of sidelink frequency hopping parameters, is associated with at least one of: a resource pool, a source identifier of a sidelink, a destination identifier of a sidelink, or a subchannel Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-28.

Aspect 31: An apparatus for wireless communication, comprising at least one means for performing the method of one or more aspects of aspects 1-28.

Aspect 32: A non-transitory computer-readable medium storing a set of instructions for wireless communication, the set of instructions comprising one or more instructions that, when executed by one or more processors of a device, cause the device to perform the method of one or more aspects of aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
a memory; and
one or more processors coupled to the memory, the memory and the one or more processors configured to:
receive, from a base station, a set of sidelink frequency hopping parameters; and
transmit, to a second UE via a sidelink interface, a frequency hopping configuration for sidelink reference signaling by the second UE, wherein the frequency hopping configuration is based at least in part on the set of sidelink frequency hopping parameters.

2. The apparatus of claim 1,
wherein the frequency hopping configuration includes one or more sidelink frequency hopping parameters selected from the set of sidelink frequency hopping parameters.

3. The apparatus of claim 1,
wherein the second UE is one of a plurality of second UEs, and wherein the one or more processors are configured to:
transmit respective frequency hopping configurations for sidelink reference signaling by each of the plurality of second UEs, wherein the respective frequency hopping configurations are based at least in part on the set of sidelink frequency hopping parameters.

4. The apparatus of claim 3,
wherein the respective frequency hopping configurations are associated with sidelink frequency hopping parameters that are different from each other.

5. The apparatus of claim 4,
wherein the different sidelink frequency hopping parameters comprise respective frequency domain shift positions.

6. The apparatus of claim 3,
wherein the respective frequency hopping configurations are associated with respective reference signal resource allocations that are orthogonal to each other.

7. The apparatus of claim 1,
wherein the second UE is associated with an active sidelink connection with the first UE.

8. The apparatus of claim 1,
wherein the frequency hopping configuration indicates a row of a table that indicates a set of reference signal resources for sidelink reference signaling.

9. The apparatus of claim 1,
wherein the set of sidelink frequency hopping parameters indicates at least one of:
a frequency domain shift position,
a size of a subband to be hopped,
a number of subbands to be hopped, or
one or more entries of a table that specifies a total bandwidth for hopping.

10. The apparatus of claim 1,
wherein the one or more processors are further configured to:
receive a reference signal from the second UE based at least in part on the frequency hopping configuration.

11. The apparatus of claim 1,
wherein the one or more processors are further configured to:
receive feedback regarding sidelink reference signaling by the second UE based at least in part on the frequency hopping configuration.

12. The apparatus of claim 1,
wherein at least one sidelink frequency hopping parameter, of the set of sidelink frequency hopping parameters, is associated with at least one of:
a resource pool,
a source identifier of a sidelink,
a destination identifier of the sidelink, or
a subchannel.

13. An apparatus for wireless communication at a first user equipment (UE), comprising:
a memory; and
one or more processors coupled to the memory, the memory and the one or more processors configured to:
receive, from a second UE via a sidelink interface, a frequency hopping configuration for sidelink reference signaling by the first UE, wherein the frequency hopping configuration is based at least in part on a set of sidelink frequency hopping parameters; and transmit a reference signal using the frequency hopping configuration.

14. The apparatus of claim 13,
wherein the frequency hopping configuration includes one or more sidelink frequency hopping parameters selected from the set of sidelink frequency hopping parameters.

15. The apparatus of claim 13,
wherein the frequency hopping configuration indicates a frequency domain shift position for the sidelink reference signaling.

16. The apparatus of claim 13,
wherein the second UE is associated with an active sidelink connection with the first UE.

17. The apparatus of claim 13,
wherein the frequency hopping configuration indicates a row of a table that indicates a set of reference signal resources for sidelink reference signaling.

18. The apparatus of claim 13,
wherein the set of sidelink frequency hopping parameters indicates at least one of:
a frequency domain shift position,
a size of a subband to be hopped,
a number of subbands to be hopped,
one or more entries of a table that specifies a total bandwidth for hopping, or
a combination thereof.

19. The apparatus of claim 13,
wherein the one or more processors, when transmitting the reference signal, are configured to:
transmit the reference signal on a reference signal resource determined based at least in part on the frequency hopping configuration.

20. The apparatus of claim 13,
wherein the one or more processors are further configured to:
determine feedback regarding sidelink reference signaling by another UE based at least in part on the frequency hopping configuration; and
transmit the feedback to the second UE.

21. An apparatus for wireless communication at a base station, comprising:
a memory; and
one or more processors coupled to the memory, the memory and the one or more processors configured to:
transmit, to a first user equipment (UE), a set of sidelink frequency hopping parameters for reference signaling by one or more second UEs of a sidelink network; and
receive reference signal reporting based at least in part on the set of sidelink frequency hopping parameters.

22. The apparatus of claim 21,
wherein the first UE is a relay UE associated with the one or more second UEs.

23. The apparatus of claim 21,
wherein the first UE is one of a plurality of first UEs, and wherein the one or more processors are configured to:
transmit respective sets of frequency hopping parameters for sidelink reference signaling associated with the plurality of first UEs, wherein the respective sets of frequency hopping parameters are associated with respective reference signal resource allocations that are orthogonal to each other.

24. The apparatus of claim 21,
wherein the one or more processors are further configured to:
receive a reference signal from the one or more second UEs based at least in part on the set of sidelink frequency hopping parameters.

25. The apparatus of claim 21,
wherein the one or more processors are further configured to:
receive feedback regarding sidelink reference signaling by the one or more second UEs based at least in part on the set of frequency hopping parameters.

26. A method of wireless communication performed by a first user equipment (UE), comprising:
receiving, from a base station, a set of sidelink frequency hopping parameters; and
transmitting, to a second UE via a sidelink interface, a frequency hopping configuration for sidelink reference signaling by the second UE, wherein the frequency hopping configuration is based at least in part on the set of sidelink frequency hopping parameters.

27. The method of claim 26,
wherein the frequency hopping configuration includes one or more sidelink frequency hopping parameters selected from the set of sidelink frequency hopping parameters.

28. The method of claim 26,
wherein the second UE is one of a plurality of second UEs, and wherein the method further comprises:
transmitting respective frequency hopping configurations for sidelink reference signaling by each of the plurality of second UEs, wherein the respective frequency hopping configurations are based at least in part on the set of sidelink frequency hopping parameters.

29. The method of claim 28,
wherein the respective frequency hopping configurations are associated with sidelink frequency hopping parameters that are different from each other.

30. The method of claim 29,
wherein the different sidelink frequency hopping parameters comprise respective frequency domain shift positions.

* * * * *